United States Patent [19]

Churchill et al.

[11] Patent Number: 4,653,618
[45] Date of Patent: Mar. 31, 1987

[54] TWIN TUBE SHOCK ABSORBER GAS SEAL

[75] Inventors: William M. Churchill, Plymouth; Anil G. Walambe, Canton, both of Mich.

[73] Assignee: International Telephone and Telegraph Corporation, New York, N.Y.

[21] Appl. No.: 834,113

[22] Filed: Feb. 24, 1986

Related U.S. Application Data

[63] Continuation of Ser. No. 497,759, May 25, 1983, abandoned.

[51] Int. Cl.$^4$ ............................. F16F 9/06; F16F 9/36
[52] U.S. Cl. ............................. 188/322.17; 188/269; 188/315; 188/318
[58] Field of Search ............... 188/322.17, 322.16, 188/322.18, 318, 317, 316, 315, 314, 269, 282; 267/64.15–64.26; 92/86, 168; 277/178, 183, 29

[56] References Cited

U.S. PATENT DOCUMENTS

| | | | |
|---|---|---|---|
| 4,108,287 | 8/1978 | Kato | 188/318 X |
| 4,189,033 | 2/1980 | Katsumori | 188/269 |
| 4,262,779 | 4/1981 | Katsumori et al. | 188/269 X |
| 4,438,834 | 3/1984 | Handke et al. | 188/322.17 X |
| 4,494,632 | 1/1985 | De Baan et al. | 188/269 |

Primary Examiner—D. C. Butler
Attorney, Agent, or Firm—James B. Raden; William J. Michals

[57] ABSTRACT

A double-cylinder shock absorber, which is particularly suitable for use in a MacPherson strut, includes an inner cylinder having a closed lower end and which is filled with oil. A piston rod extends into the inner cylinder through the upper end thereof. A piston is secured to the lower end of the piston rod and divides the cylinder into upper and lower oil chambers. The piston is provided with a fluid metering device providing a damping force mechanism. A rod guide head closes the upper end of the inner cylinder and is provided with an opening which is slightly spaced from the piston rod to form an annular clearance therebetween. An outer cylinder is coaxially disposed around the inner cylinder and forms therewith an annular reservoir chamber having closed upper and lower ends. The lower portion of the reservoir chamber is filled with oil and the upper portion is filled with gas. A passage way is provided between the upper portion of the reservoir chamber and the inner cylinder and includes the annular clearance between the rod guide head and the piston rod. An integral gas seal is disposed in the passage way and includes a main seal portion sealingly engaging the piston rod at a position above the rod guide head for preventing oil passing through the annular clearance from escaping from the shock absorber. The other end of the gas seal is provided with a gas seal lip portion having a flexible portion for engaging the rod guide head or the inner surface of the outer cylinder. Accordingly, excess oil from the upper oil chamber of the inner cylinder will pass into the reservoir chamber but gas in the reservoir chamber closes the gas seal thereby to seal the passage.

5 Claims, 5 Drawing Figures

TWIN TUBE SHOCK ABSORBER GAS SEAL

This application is a continuation of application Ser. No. 497,759, filed May 25, 1983, now abandoned.

BACKGROUND OF THE INVENTION

This invention relates to twin tube shock absorbers having gas seal means therein and, more particularly, to such devices utilizing integral main seal and gas seal portions. The shock absorber of the present invention is particularly useful in MacPherson strut vehicle suspension systems.

Shock absorbers for use in a vehicle suspension system of the type including a double-walled cylindrical structure which includes an inner oil cylinder and an outer reservoir chamber are known and have been widely used in the art. In this type of shock absorber any air that is trapped in the working or oil cylinder as a result of operation of the shock absorber is bled into the reservoir chamber. During the downstroke of the piston in the oil cylinder the air in the reservoir chamber must be prevented from entering the oil cylinder. In the prior art, various one-way valves have been provided in a narrow passage which communicates between the working cylinder and the outer cylinder. These valves have disadvantages in that they are complicated mechanical devices, typically comprising a spring-loaded ball valve and valve seat, and are not easily mounted in the narrow passage that connects the working and reservoir chambers. Other gas seal techniques have been provided which eliminate the complicated mechanical solutions of the prior art and are illustrated in U.S. Pat. No. 4,108,287. These prior art devices utilize a multiple seal configuration wherein a first seal is provided between the piston rod and the cylinder cap to trap the oil within the shock absorber. A second flexible seal is spring loaded in the passage way and functions to prevent the passage of gas into the inner or working cylinder. These prior art devices have the disadvantage that they are difficult to assemble and more expensive to manufacture.

These and other disadvantages are overcome by the present invention wherein there is provided a gas seal for a double-cylinder or twin tube shock absorber which is of an integral, one-piece construction which readily can be mounted in the passageway connected to the working cylinder with the reservoir chamber and which simultaneously provides the piston rod and gas sealing functions.

SUMMARY OF THE INVENTION

Briefly, a twin tube shock absorber having an oil cylinder and a gas tube which are concentrically joined together to form a gas chamber therebetween is provided. A piston and a rod are reciprocally moved in the oil cylinder. An annular bearing having an axially extending cylindrical support system is fixed to an end portion of the oil cylinder and forms an oil chamber which cooperates with the oil cylinder and the piston rod which supports the rod in such a manner that the rod can be slidingly moved. An oil seal which includes a main lip sealingly slidable with respect to the circumferential surface of the rod is provided. The seal includes a check valve lip having a substantially frustroconical shape which resiliently contacts the outer circumferential surface of the cylindrical support portion. The check valve lip is adapted to allow oil to flow from the oil chamber to the gas chamber and to prevent oil and gas from flowing in the opposite direction. The oil seal is provided as a radially-extending portion integrally formed with the main lip and connected thereto.

BRIEF DESCRIPTION OF THE DRAWING

The advantages of this invention will become more readily appreciated as the same becomes completely understood by reference to the following detailed description when taken in conjunction with the accompanying drawing wherein.

DETAILED DESCRIPTION

Figure 1:
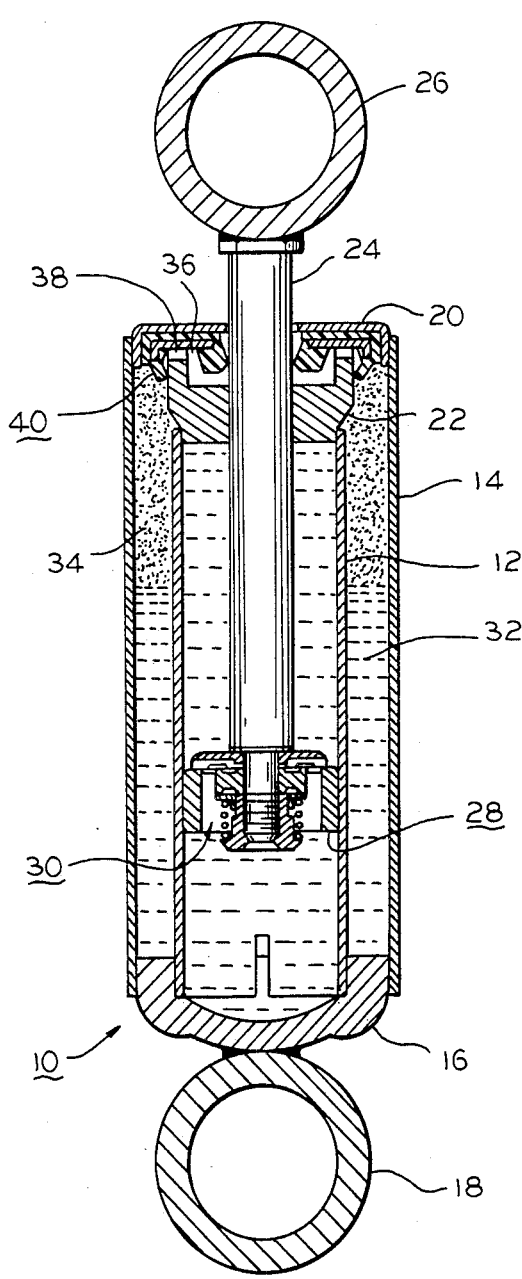
FIG. 1 is a cross-sectional plan view of a twin tube shock absorber constructed in accordance with the principles of the present invention.
Figure 2:
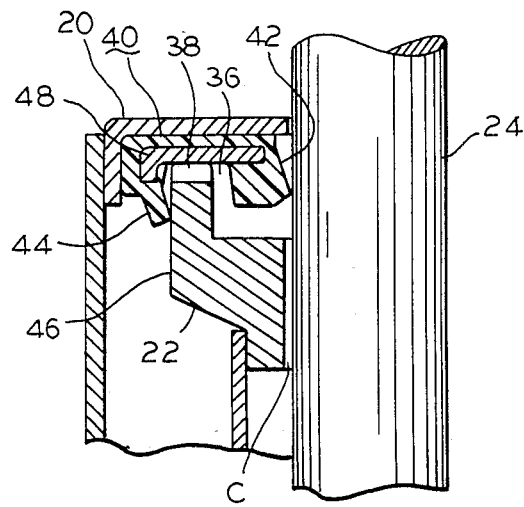
FIG. 2 is a partial sectional view of the gas seal illustrated in FIG. 1.

Referring now to FIG. 1 there is shown a cross-sectional plan view of a twin tube shock absorber 10 constructed in accordance with the principles of the present invention. Shock absorber 10 includes an inner generally cylindrical pressure cylinder 12 which is coaxially surrounded by an outer cylinder 14. Outer cylinder 14 is closed by a lower cap 16 which is connected to a mounting ring 18. The upper end of cylinder 14 is partially closed by a cap 20. Lower cap 16 also functions to close the lower end of inner cylinder 12. The upper end of cylinder 12 is partially closed by a rod guide 22 which typically comprises a sintered iron head. The central opening of rod guide 22 accepts a piston rod 24 having a mounting ring 26 on one end thereof and a piston 28 at the other end thereof. Piston 28 includes fluid metering means shown generally at 30 to provide a damping force as is well known in the art. Cylinder 12 is filled with oil and the reservoir chamber formed between the opposing walls of cylinder 12 and 14 includes a lower portion shown generally at 32 which is filled with oil and a upper portion shown generally at 34 which is filled with gas. The inner surface of the central bore of rod guide 22 is slightly spaced from the outer surface of piston rod 24 and forms an annular clearance C therebetween. This clearance communicates with a passage shown generally at 36 which communicates through a slot or holes 38 into the reservoir chamber. As best illustrated in FIG. 2, gas seal means 40 is disposed in the passage way which connects the working chamber of cylinder 12 with the reservoir chamber. Gas seal means 40 includes a main lip 42 which sealingly engages the cylindrical surface of piston rod 24 to prevent the escape of oil and gas from shock absorber 10. Gas seal means 40 further includes a gas sealing lip 44 which comprises a downwardly extending flexible portion which engages a radially outer surface 46 of rod guide 22. Gas sealing lip 44 is deflected by oil passing through clearance C allowing the oil to pass into the reservoir chamber. However, gas in the reservoir chamber will force gas sealing lip 44 against the valve seat provided by the radially outer surface 46 of rod guide 22 to prevent the gas from entering into the oil or working cylinder. It can be seen that gas seal means 40 is provided as an integral unitary structure of a suitable elastomeric material and which is provided with a metallic reinforcing member 48 integrally molded therein. It can also be seen that gas seal means 40 is readily and easily mounted in shock absorber 10 between an upwardly projecting portion of rod guide 22 and cap 20. That is, gas seal means 40 is captured and press-fitted between cap 20 and the upwardly projecting portion of rod guide 22. The assembly is completed by suitably fastening cap 20 to the inner surface of cylinder 14 such as by welding.

Figure 3:
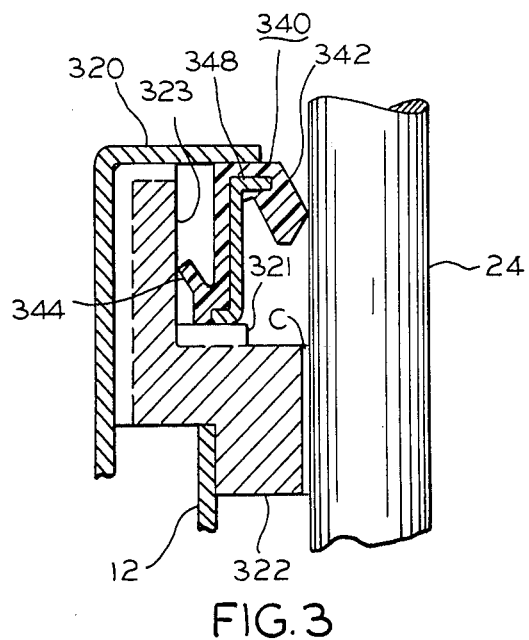
FIG. 3 is an alternate embodiment of the gas seal in accordance with the present invention.

Referring now to FIG. 3, there is shown an alternate embodiment of the present invention. FIG. 3 illustrates an alternate gas seal means 340 which includes a main seal 342, a gas seal lip 344 and a metallic reinforcement 348. Gas seal means 340 is similar to gas seal means 40 but differs in that gas seal lip 344 engages a radially inwardly facing portion 323 of a rod guide 322. The lower portion of gas seal means 340 engages a land 321 of rod guide 322. It can be seen that gas seal means 340 is captured between cap 320 and land 321.

Figure 4:
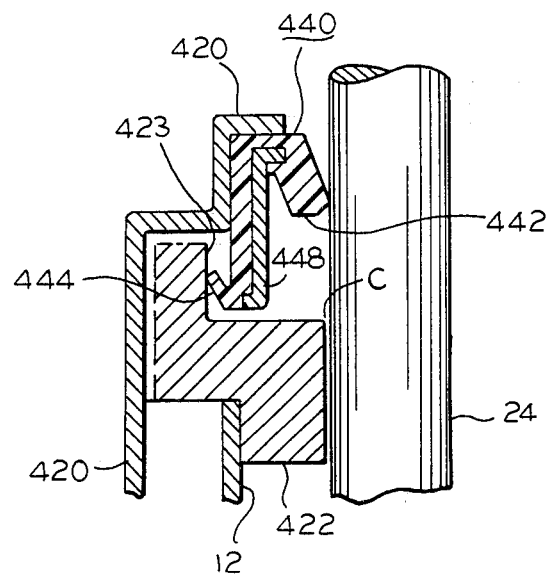
FIG. 4 is a second alternate embodiment of the gas seal in accordance with the present invention; and, FIG. 5 is still another alternate embodiment of a gas seal in accordance with the principles of the present invention.

Referring now to FIG. 4, there is shown an alternate embodiment of the present invention. FIG. 4 illustrates a gas seal means 440 having a main seal 442, a lip seal 444 and a reinforcement member 448. Lip seal 444 engages a radially inwardly facing portion 423 of rod guide 422. In this embodiment, gas seal means 440 preferably is bonded to a portion of cap 420 prior to the final assembly of the shock absorber.

Figure 5:
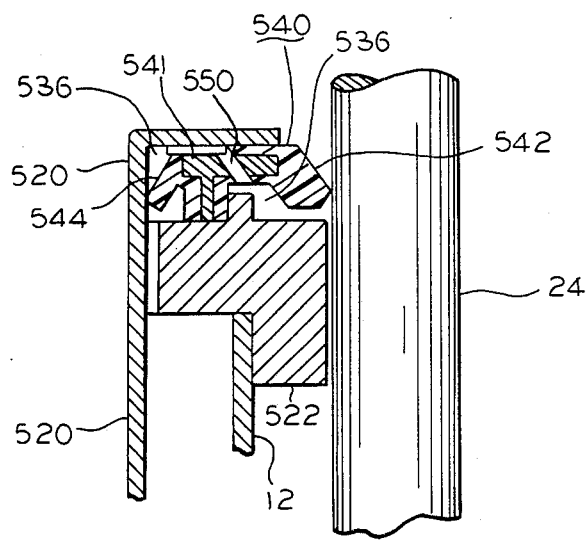

Referring now to FIG. 5 there is shown another alternate embodiment of the present invention. FIG. 5 illustrates a gas seal means 540 having a main seal 542 and a lip seal 544. Gas seal means 540 includes a metal washer 541 which is insert molded within the body of gas seal means 540. Gas seal means 540 further includes a passage 550 which communicates with passage 536 on both sides of gas seal 540. It can be seen that lip seal 544 engages the radially inner surface of cap 520.

What has been taught, then, is a twin tube shock absorber including an integral gas seal means disposed between the working and reservoir chambers. The shock absorber is particularly suited for use in MacPherson strut vehicle suspension systems. The invention facilitates, notably, gas sealing means which is easily produced and economical to manufacture. The forms of the inventions illustrated and described herein are but preferred embodiments of these teachings. They are shown as illustrations of the inventive concepts however rather than by way of limitation and its is pointed out that various modifications and alterations may be indulged in with the scope of the appended claims.

What is claimed is:

1. A double-cylinder shock absorber comprising:
   an inner cylinder having a closed lower end and an upper end, said inner cylinder being filled with oil;
   a piston rod extending into said inner cylinder through said upper end thereof;
   a piston secured to the lower end of said piston rod, said piston slidably contacting the inner wall surface of said inner cylinder, said piston dividing the interior of said inner cylinder into upper and lower oil chambers, said piston having a damping force producing mechanism;
   a rod guide closing said upper end of said inner cylinder, said rod guide having therethrough an opening through which said piston rod slidably extends, said opening being formed by a surface which is slightly spaced from said piston rod to form a small annular clearance therebetween, said rod guide having an upper surface and an annular projection extending upwardly from said upper surface;
   an outer cylinder coaxially surrounding said inner cylinder and forming therewith an annular reservoir chamber having closed upper and lower ends, said reservoir chamber having a lower portion filled with oil and an upper portion filled with gas;
   passage means, including said clearance, extending from said upper oil chamber of said inner cylinder to said gas-filled upper portion of said reservoir chamber; and
   means, positioned in and closing said passage means, for causing all oil passing through said clearance from said upper oil chamber to pass into said reservoir chamber, and for preventing gas in said reservoir chamber from passing into said upper oil chamber, said means comprising main seal means sealingly engaging said piston rod at a position above a portion of said rod guide, for preventing said oil passing through said clearance from said upper oil chamber from escaping from said passage means, and gas seal means having a downwardly extending flexible annular projection having a radially outer surface which sealingly engages the radially inner surface of said outer cylinder whereby said oil passing through said clearance from said upper oil chamber will deflect said annular projection of said gas seal means away from said valve seat and will pass to said reservoir chamber, but whereby gas from said reservoir chamber will force said annular projection of said gas seal means against said valve seat and thereby seal said passage means.

2. The shock absorber according to claim 1, wherein said main seal means and gas seal means are integrally formed as an elastomeric member.

3. The shock absorber according to claim 2, wherein said elastomeric member includes a metallic reinforcement member.

4. The shock absorber according to claim 3, wherein said elastomeric member is captured in the shock absorber between said rod guide and the closed upper end of said cylinder.

5. The shock absorber according to claim 3, wherein said reinforcement member is bonded to and depends downwardly from an upper cap member which closes said outer cylinder.

* * * * *